(12) United States Patent
Sakata

(10) Patent No.: US 8,194,787 B2
(45) Date of Patent: Jun. 5, 2012

(54) COMMUNICATION SYSTEM, TRANSMITTER, COMMUNICATION METHOD, AND TRANSMITTER DETECTION METHOD

(75) Inventor: Ren Sakata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1035 days.

(21) Appl. No.: 11/907,347

(22) Filed: Oct. 11, 2007

(65) Prior Publication Data

US 2008/0175336 A1 Jul. 24, 2008

(30) Foreign Application Priority Data

Jan. 19, 2007 (JP) ................................. P2007-10373

(51) Int. Cl.
*H03K 7/06* (2006.01)
(52) U.S. Cl. ........................................ 375/316; 375/349
(58) Field of Classification Search .................. 375/316, 375/303, 260, 295, 334, 349, 325, 324, 326; 455/130, 131, 141, 293, 215, 509, 165.1
See application file for complete search history.

(56) References Cited

U.S. PATENT DOCUMENTS

| | | | | |
|---|---|---|---|---|
| 4,310,806 A * | 1/1982 | Ogasawara | ...................... | 331/40 |
| 5,241,544 A * | 8/1993 | Jasper et al. | .................. | 370/478 |
| 5,343,499 A * | 8/1994 | Jasper et al. | .................. | 375/261 |
| 5,446,421 A * | 8/1995 | Kechkaylo | ...................... | 332/100 |
| 5,805,242 A * | 9/1998 | Strolle et al. | .................. | 348/726 |
| 6,366,621 B1 * | 4/2002 | Kuntz et al. | ................... | 375/321 |
| 6,721,267 B2 * | 4/2004 | Hiben et al. | ................... | 370/206 |
| 2006/0198451 A1 * | 9/2006 | Guruprasad | ................... | 375/260 |
| 2006/0256884 A1 | 11/2006 | Tomioka et al. | | |
| 2007/0253394 A1 | 11/2007 | Horiguchi et al. | | |
| 2008/0153553 A1 | 6/2008 | Horiguchi et al. | | |
| 2010/0081386 A1 * | 4/2010 | Sakata et al. | .................... | 455/42 |

FOREIGN PATENT DOCUMENTS

| | | |
|---|---|---|
| JP | 58-071737 | 4/1983 |
| JP | 03-280736 | 12/1991 |
| JP | 07-038467 | 2/1995 |
| JP | 2000-341240 | 12/2000 |
| JP | 2001-103102 | 4/2001 |
| JP | 2003-283587 | 10/2003 |

OTHER PUBLICATIONS

Office Action dated Aug. 19, 2011 in JP Application No. 2007-010373 with English-language translation. Sakata, R. et al.; "*A Broadcast Signal Transmission Scheme for Cognitive Radio System*"; 2007 IEICE Technical Report; Sep. 10-14, 2007; pp. 507-508.
Sakata, R. et al.; *A Cognitive Radio Transmission Scheme without a Carrier Frequency Information*; 2008 IEICE Technical Report; Feb. 28, 2008; pp. 45-51.
English-language machine translation of JP 07-038467, Feb. 1995.
English-language machine translation of JP 2001-103102, Apr. 2001.
English-language machine translation of JP 2003-283587, Oct. 2005.

* cited by examiner

*Primary Examiner* — Aristocratis Fotakis
(74) *Attorney, Agent, or Firm* — Nixon & Vanderhye, P.C.

(57) ABSTRACT

Disclosed is a communication system, having: a transmitter including: a first frequency converter converting a frequency of a provided signal to a first frequency band to generate a first signal and converting the frequency of the provided signal to a second frequency band to generate a second signal, the second frequency band having a given frequency difference against the first frequency band; and a combiner combining the first signal and the second signal to output a transmission signal, and a receiver including: a second frequency converter converting the transmission signal to a frequency-shifting signal shifted by the given frequency difference; a first multiplier multiplying the transmission signal and the frequency-shifting signal together to output a multiplied signal; a filter extracting a baseband signal from the multiplied signal; and a detector detecting significant information from the baseband signal.

10 Claims, 11 Drawing Sheets

ORIGINAL SIGNAL (OOK)
LENGTH : τ
SYMBOL RATE : Fs

ORIGINAL SIGNAL (BPSK)
LENGTH : τ
SYMBOL RATE : Fs

COMMUNICATION SYSTEM, TRANSMITTER, COMMUNICATION METHOD, AND TRANSMITTER DETECTION METHOD

CROSS-REFERENCE TO RELATED APPLICATIONS

This application is based upon and claims the benefit of priority from the prior Japanese Patent Application No. 2007-10373, filed on Jan. 19, 2007; the entire contents of which are incorporated herein by reference.

BACKGROUND OF THE INVENTION

1. Field of the Invention

The present invention relates to a radio communication system and particularly relates to a transmission method of a broadcast signal.

2. Description of the Related Art

In general, a receiver in a radio communication system is required to know in advance concrete information (information necessary for communication such as a transmission frequency and synchronization information, for example) of a corresponding transmitter. It is suggested a technology in which transmission of a broadcast signal and the like by a transmitter enables communication even if a receiver does not know part of such concrete information in advance. As a method in which a receiver detects existence of a transmitter of an existing radio communication system and further establishes time synchronization with the transmitter in the system, there is known a method of transmitting a transmission sequence superior in an autocorrelation characteristic continuously in terms of time (for example, see JP-A 2000-341240 (KOKAI)).

According to this method, the transmitter transmits a signal sequence of a given sequence length continuously and the receiver multiplies together the received signal and a signal made by delaying the received signal by the sequence length and subjecting the delayed signal to a complex conjugate computation, whereby a high correlation value can be obtained. Further, a time at which the correlation value is obtained by this method can be regarded as a time when the transmitter transmits the signal, and therefore it is possible to establish time synchronization between the transmitter and the receiver. If the high correlation value cannot be obtained by this method, it can be regarded that such a signal sequence is not transmitted, and it is possible to judge that the transmitter does not exist.

As a means for detecting a transmission signal by such a method, there is known a method in which a matched filter is used. In this method, a signal sequence with high autocorrelation capability is decided in advance between a transmitter and a receiver and the transmitter transmits this signal sequence with a given frequency. The corresponding receiver operates in advance a matched filter whose tap coefficient is this signal sequence and obtains a high signal output if the signal sequence is received, whereby detects existence of the transmitter.

However, in the method in which the same signal sequence is repeatedly transmitted, since the received signal is delayed, the receiver must have a relatively large capacity memory. This is ineffective in terms of design, and becomes a cause of a large scale device configuration, increased power consumption and the like.

In a method in which the matched filter is used, it is required to negotiate the signal sequence in advance, and in addition, the frequency with which the signal sequence is transmitted must be known. Therefore, in a circumstance in which the transmission frequency of the signal sequence is not known, using the method in which the matched filter is used is difficult.

SUMMARY OF THE INVENTION

A communication system being an aspect of the present invention has, a transmitter including: a first frequency converter converting a frequency of a provided signal to a first frequency band to generate a first signal and converting the frequency of the provided signal to a second frequency band to generate a second signal, the second frequency band having a given frequency difference against the first frequency band; and a combiner combining the first and second signals to output a transmission signal, and a receiver including: a second frequency converter converting the transmission signal to a frequency-shifting signal shifted by the given frequency difference; a first multiplier multiplying the transmission signal and the frequency-shifting signal together to output a multiplied signal; a filter extracting a baseband signal from the multiplied signal; and a detector detecting significant information from the baseband signal.

A transmitter being another aspect of the present invention includes: a frequency converter converting a frequency of a provided signal to a first frequency band to generate a first signal and converting the frequency of the provided signal to a second frequency band to generate a second signal, the second frequency band having a given frequency difference against the first frequency band; and a combiner combining the first and second signals to output a transmission signal.

A communication method being still another aspect of the present invention includes: transmitting, by a transmitter, a first signal generated by converting a frequency of a provided signal to a first frequency band, and a second signal generated by converting the frequency of the provide signal to a second frequency band having a given frequency difference against the first frequency band collectively as a transmission signal; converting, by a frequency converter of a receiver, the transmission signal to a frequency-shifting signal shifted by the given frequency difference; multiplying, by a multiplier of the receiver, the transmission signal and the frequency-shifting signal together to output a multiplied signal; extracting, by a filter of the receiver, a baseband signal from the multiplied signal; and detecting, by a detector of the receiver, significant information from the baseband signal.

A transmitter detecting method being yet another aspect of the present invention includes: converting, by a frequency converter, a transmission signal having a first signal generated by converting a frequency of a provided signal to a first frequency band and a second signal generated by converting the frequency of the provided signal to a second frequency band having a given frequency difference against the first frequency band, to a frequency-shifting signal shifted by the given frequency difference; multiplying, by a multiplier, the transmission signal and the frequency-shifting signal together to output a multiplied signal; extracting, by a filter, a baseband signal from the multiplied signal; and detecting, by a detector, significant information from the baseband signal.

DETAILED DESCRIPTION OF THE INVENTION

Description of Embodiments

Embodiments of the present invention will be described with reference to the drawings, but those drawings are provided for the purpose of illustration only and are not intended to define the limits of the invention.

Figure 1:
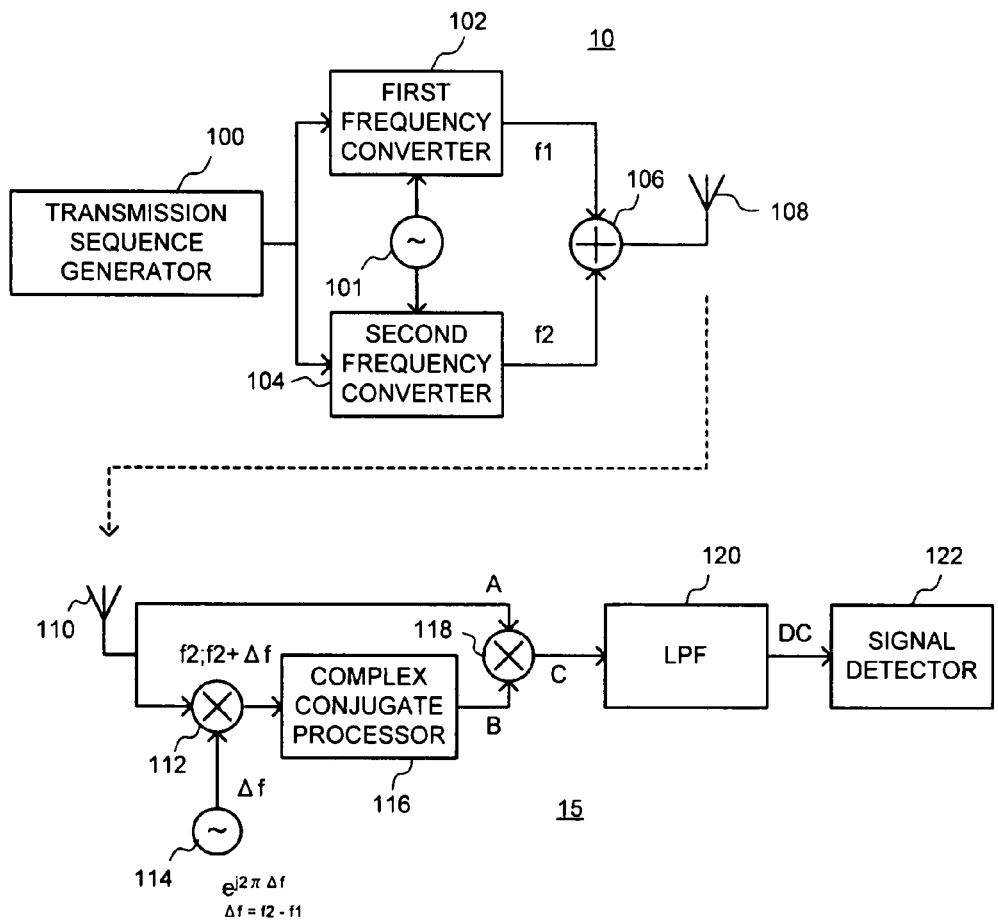
FIG. 1 is a block diagram showing a configuration of a communication system according to a first embodiment.
Figure 2:
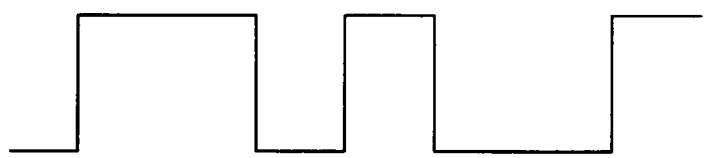
FIG. 2 is a chart showing a waveform example of a transmission sequence of the communication system according to the first embodiment.
Figure 3:
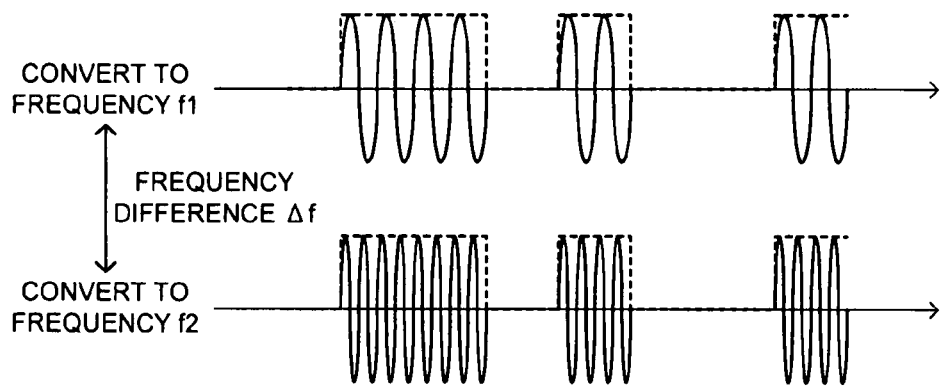
FIG. 3 is a chart showing output examples of a first frequency converter and a second frequency converter of the communication system according to the first embodiment.
Figure 4:
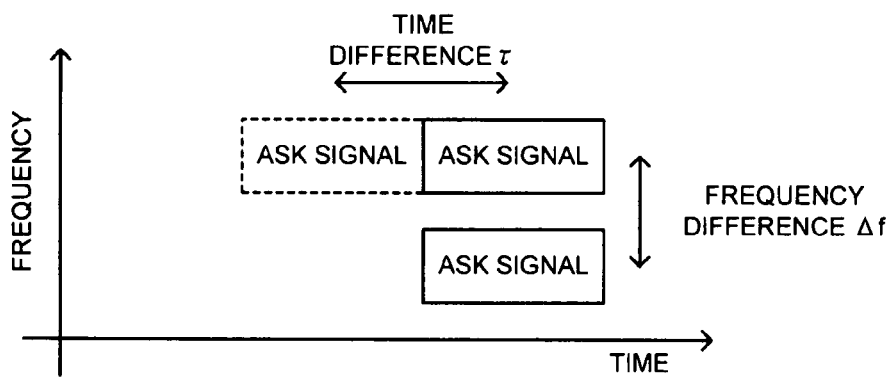
FIG. 4 is a chart showing an example of broadcast signals transmitted by the transmitter of the communication system according to the first embodiment.

Hereinafter, the embodiments will be described in detail with reference to the drawings. FIG. 1 shows a configuration of a communication system according to a first embodiment, FIG. 2 shows a waveform example of a transmission sequence of the communication system according to this embodiment, and FIG. 3 shows waveform examples of a first frequency converter and a second frequency converter as well. FIG. 4 shows an example of a broadcast signal transmitted by a transmitter of the communication system according to this embodiment, FIG. 5 explains an operation of the communication system of this embodiment, and FIG. 6 explains the operation as well. As shown in FIG. 1, the communication system of this embodiment includes a transmitter 10 and a receiver 15. In the communication system of this embodiment, the transmitter 10 transmits a signal (hereinafter, referred to as "broadcast signal") to indicate existence of the transmitter 10 to the receiver 15.

The broadcast signal includes detailed information (concrete information) with regard to a communication method used by the transmitter 10 in communication with the receiver 15. As the detailed information of the communication method, there can be cited, for example, a frequency (not always the same as a transmission frequency of a broadcast signal) used by a transmitter in communication, a modulation method, an error correction encoding method, an error correction encoding rate, a frame format and the like. A synchronizing signal for establishing synchronization between the transmitter 10 and the receiver 15 may be included.

The receiver 15 has a function of searching a broadcast signal transmitted by the transmitter 10, in order to investigate whether or not the corresponding transmitter 10 exists within a communication range. The receiver 15 first receives the broadcast signal and detects existence of the transmitter 10, and performs synchronous processing with the transmitter 10. Further, the receiver 15 demodulates data included in the received broadcast signal and obtains concrete information to perform communication with the transmitter 10 in subsequent communication, the concrete information being the frequency, the modulation method, the error correction encoding method, the error correction encoding rate, the frame format, and the like, for example, and becomes ready for reception of the subsequent communication.

The receiver 15 receives not only the broadcast signal transmitted by the transmitter 10 but also an interference wave transmitted from another transmitter. In the communication system according to this embodiment, based on the broadcast signal transmitted by the corresponding transmitter 10, the receiver 15 searches the transmitter 10 and obtains concrete information used for the subsequent communication, so that setting of a communication procedure can be realized even under a circumstance in which an interference wave exists.

Subsequently, the transmitter 10 will be described in detail. The transmitter 10 includes a transmission sequence generator 100, a local oscillator 101, a first frequency converter 102, a second frequency converter 104, a combiner 106 and a transmitting antenna 108. By using given concrete information for communicating with the receiver 15, the transmission sequence generator 100 generates a transmission sequence including the concrete information. The transmission sequence is a baseband signal to which a bit-modulation by a data column to be transmitted is applied. In this embodiment, a modulation method is OOK (On-Off Keying). A length of the sequence is $\tau$, and a modulation speed is Fs. In other words, the transmission sequence generator 100 generates a signal shown in FIG. 2.

The local oscillator 101 generates local signals for the first frequency converter 102 and the second frequency converter 104 each performing frequency conversion, and provides the local signals to each thereof. The first frequency converter 102 and the second frequency converter 104 convert the transmission sequence of the baseband generated by the transmission sequence generator 100 to given transmission frequencies f1 and f2 respectively. The first frequency converter 102 and the second frequency converter 104 are synchronous to each other, and a given frequency difference $\Delta f (=f2-f1)$ is set between the converted frequencies f1 and f2.

The first frequency converter 102 and the second frequency converter 104 can be realized by a mixer and the like. In this case, the local oscillator 101 supplies local signals of the frequency difference $\Delta f$ to the first frequency converter 102 and the second frequency converter 104 respectively. It can also be constituted that the second frequency converter 104 is provided thereinside with a signal generator of a frequency Δf and a mixer in advance, and that the local oscillator 101 supplies common local signals to the first frequency converter 102 and the second frequency converter 104 respectively. Examples of output signals of the first frequency converter 102 and the second frequency converter 104 are shown in FIG. 3.

The combiner 106 combines an output of the first frequency converter 102 and an output of the second frequency converter 104. In other words, the combiner 106 superimposes a transmission signal of a frequency f1 on a transmission signal of a frequency f2 to generate a transmission signal having two frequency spectra. The transmitting antenna 108 radiates the transmission signal generated by the combiner 106 as a radio wave.

The signals transmitted by the transmitter 10 are represented on a time frequency plane as signals indicated by solid lines in FIG. 4. In other words, the OOK signals whose frequencies are apart by Δf form a line in a frequency direction. The signals are transmitted simultaneously (synchronously) in a time direction. It should be noted that a signal indicated by a broken line in FIG. 4 is an example of an existing broadcast signal made by the same transmission sequence being transmitted at the same frequency with the time difference T being set.

Next, the receiver 15 will be described in detail. The receiver 15 includes a receiving antenna 110, a first mixer 112, a local oscillator 114, a complex conjugate processor 116, a second mixer 118, a low pass filter (LPF) 120 and a signal detector 122.

The receiving antenna 110 receives broadband high frequency signals including the broadcast signal of the frequencies f1 and f2 transmitted by the transmitter 10. In other words, an interference wave transmitted simultaneously by an interference source is inputted together to the receiving antenna 110. A high frequency amplifier such as an LNA, for example, can be provided for output of the receiving antenna 110.

The first mixer 112 is a frequency converter converting a frequency of a high frequency signal received by the receiving antenna 110. The local oscillator 114 oscillates a local signal for the first mixer 112 performing frequency conversion. This local signal corresponds to the frequency difference Δf between the frequencies f1 and f2 of the transmission signal transmitted by the transmitter 10, and is a sinusoidal wave of the frequency Δf indicated by $e^{j2\pi\Delta f}$, for example. In other words, the first mixer 112 multiplies the received broadcast signal of the frequencies f1 and f2 and the local signal of the frequency Δf together, to convert the signals to a signal of frequencies f2 and f2+Δf.

The complex conjugate processor 116 converts an inputted high frequency signal to a complex conjugate signal (signal made by reversing a sign of an imaginary part). For example, the complex conjugate processor 116 converts a signal indicated by $e^{j2\pi f2}$ to a signal indicated by $e^{-j2\pi f2}$.

The second mixer 118 multiplies the high frequency signal received by the receiving antenna 110 and a high frequency signal passed through the first mixer 112 and the complex conjugate processor 116 together. The LPF 120 passes a signal (a baseband signal in this embodiment) of frequency equal to or smaller than a given frequency among the signals outputted by the second mixer 118.

If a pass bandwidth of the LPF 120 is equal to a signal bandwidth of the broadcast signal transmitted by the transmitter 10, the broadcast signal itself is obtained as an output of the LPF 120. In a case that the broadcast signal is an OOK-modulated signal, if the pass bandwidth of the LPF 120 is narrower than the bandwidth of the broadcast signal, demodulation of a transmitted bit sequence is difficult. However, even in such a case, since a comparatively large output can be obtained from the LPF 120, detection of existence of the broadcast signal (furthermore, existence of the transmitter 10) itself is possible.

The signal detector 122 has a function of detecting presence/absence of a signal outputted from the LPF 120 and retrieving the concrete information from the signal in a case that the signal is detected. More specifically, the signal detector 122 performs threshold value judgment on the output signal of the LPF 120, and if a value larger than a threshold value is obtained, the signal detector 122 judges that the transmitter 10 transmits the broadcast signal (or that the transmitter 10 exists). Further, the signal detector 122 retrieves the OOK-modulated concrete information from the output signal of the LPF 120, to be ready for reception of subsequent communication.

Here, an operation of the communication system according to the first embodiment will be described with reference to FIG. 5 and FIG. 6. When the transmission sequence generator 100 generates the transmission sequence of the baseband (a step 130 in FIG. 6. Hereinafter referred to as "S130"), and the transmission sequence is distributed (S132), the first frequency converter 102 converts the transmission sequence to the frequency f1 (b in FIG. 5) and the second frequency converter 104 converts the transmission sequence to the frequency f2 (c in FIG. 5) (S134). Here, the frequency difference Δf=f2−f1. A spectrum a in FIG. 5 positioned at a frequency f0 indicates an interference wave radiated from other than the transmitter 10.

The combiner 106 combines the converted transmission sequence of the frequency f1 and the transmission sequence of the frequency f2 (S136), and outputs the high frequency signal having spectra of the frequencies f1 and f2. The high frequency signal outputted from the combiner 106 is radiated to a space as a radio wave from the transmitting antenna 108 (S138).

When the receiving antenna 110 receives the high frequency signal from the transmitter 10 (S140), the high frequency signal is distributed into two, one being inputted to the first mixer 112 and the other being inputted to the second mixer 118 respectively (S142). The first mixer 112 multiplies the high frequency signal from the receiving antenna 110 and the local signal of the local oscillator 114 together (S144).

Here, a frequency of the interference wave is f0, and frequencies of the broadcast signal are f1 and f2. The interference wave of the frequency f0, the broadcast signal of the frequencies f1 and f2 and the local signal of the frequency Δf are presumed to be unmodulated sinusoidal waves for the sake of simplification, and they are indicated by $e^{j2\pi f0}$ (a in FIG. 5), $e^{j2\pi f1}$ (b in FIG. 5), $e^{j2\pi f2}$ (c in FIG. 5), and $e^{j2\pi\Delta f}$ respectively. Then, the signals outputted from the first mixer 112 are as follows.

$$e^{j2\pi f0} \times e^{j2\pi\Delta f} = e^{j2\pi(f0+\Delta f)} \quad \text{(d in FIG. 5)}$$

$$e^{j2\pi f1} \times e^{j2\pi\Delta f} = e^{j2\pi(f1+f2-f1)} = e^{j2\pi f2} \quad \text{(e in FIG. 5)}$$

$$e^{j2\pi f2} \times e^{j2\pi\Delta f} = e^{j2\pi(f2+\Delta f)} \quad \text{(f in FIG. 5)}$$

Subsequently, the complex conjugate processor 116 outputs the complex conjugate signal of the signal from the first mixer 112 (S146). In other words, the output signals (signals at a point B in FIG. 1) of the complex conjugate processor 116 are as follows.

$$e^{j2\pi(f0+\Delta f)} -> e^{-j2\pi(f0+\Delta f)}$$

$$e^{j2\pi f2} -> e^{-j2\pi f2}$$

$$e^{j2\pi(f2+\Delta f)} -> e^{-j\pi 2(f2+\Delta f)}$$

Meanwhile, the signal received by the receiving antenna 110 is distributed and inputted also to the second mixer 118. The second mixer 118 multiplies the signal received by the receiving antenna 110 and the output signal of the complex conjugate processor 116 together (S148). The high frequency signals received by the receiving antenna 110, that is, signals at a point A in FIG. 1 are $e^{j2\pi f0}$ (a in FIG. 5), $e^{j2\pi f1}$ (b in FIG. 5), $e^{j2\pi f2}$ (c in FIG. 5), while the high frequency signals at the point B in FIG. 1 are, as stated above, $e^{-j2\pi(f0+\Delta f)}$, $e^{-j2\pi f2}$, and $e^{-j\pi 2(f2+\Delta f)}$. When the both are multiplied, a formula becomes as follows.

$$e^{j2\pi f0} \cdot e^{-j2\pi(f0+\Delta f)} + e^{j2\pi f1} \cdot e^{-j2\pi(f0+\Delta f)} + e^{j2\pi f2} \cdot e^{-j2\pi(f0+\Delta f)} +$$
$$e^{j2\pi f0} \cdot e^{-j2\pi f2} + e^{j2\pi f1} \cdot e^{-j2\pi f2} + e^{j2\pi f2} \cdot e^{-j2\pi f2} +$$
$$e^{j2\pi f0} \cdot e^{-j2\pi(f2+\Delta f)} + e^{j2\pi f1} \cdot e^{-j2\pi(f2+\Delta f)} + e^{j2\pi f2} \cdot e^{-j2\pi(f2+\Delta f)} =$$
$$e^{-j2\pi \Delta f} + e^{-j2\pi(f0+\Delta f - f1)} + e^{-j2\pi(f0-f1)} + e^{j2\pi(f0-f2)} +$$
$$e^{-j2\pi \Delta f} + e^0 + e^{-j2\pi(f2+\Delta f - f0)} + e^{-j2\pi 2\Delta f} + e^{-j2\pi \Delta f}$$

In other words, a broadcast signal component of the frequency f2 is converted to the baseband signal, while the interference wave of the frequency f0 and the broadcast signal component of flare converted to the high frequency signal of frequencies other the frequencies f0, f1, and f2.

The LPF 120 mainly passes e0 being the baseband signal among signals outputted from the second mixer 118 (S159). Therefore, the signal components other than e0 are attenuated by the LPF 120. The signal filtered by the LPF 120 is transmitted to the signal detector 122.

Figure 5:
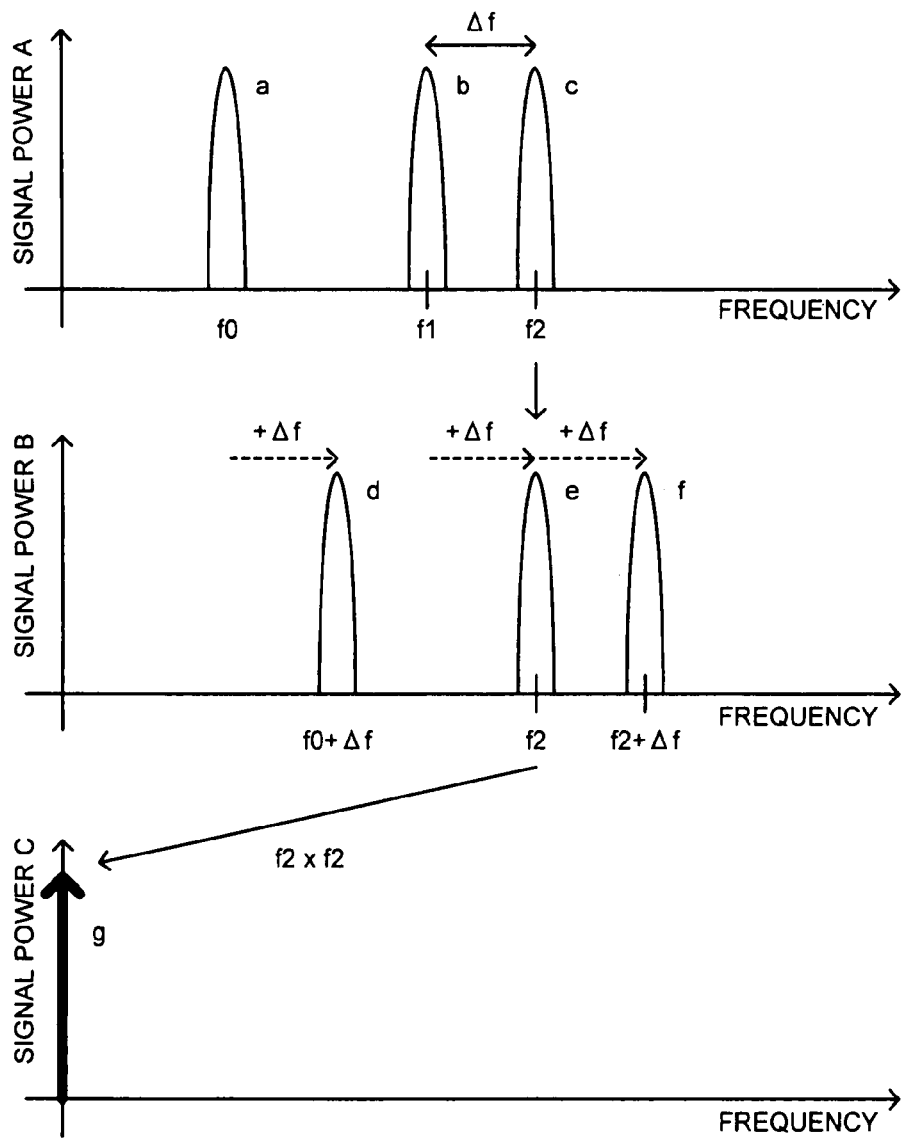
FIG. 5 is a chart explaining an operation of the communication system according to the first embodiment.
Figure 6:
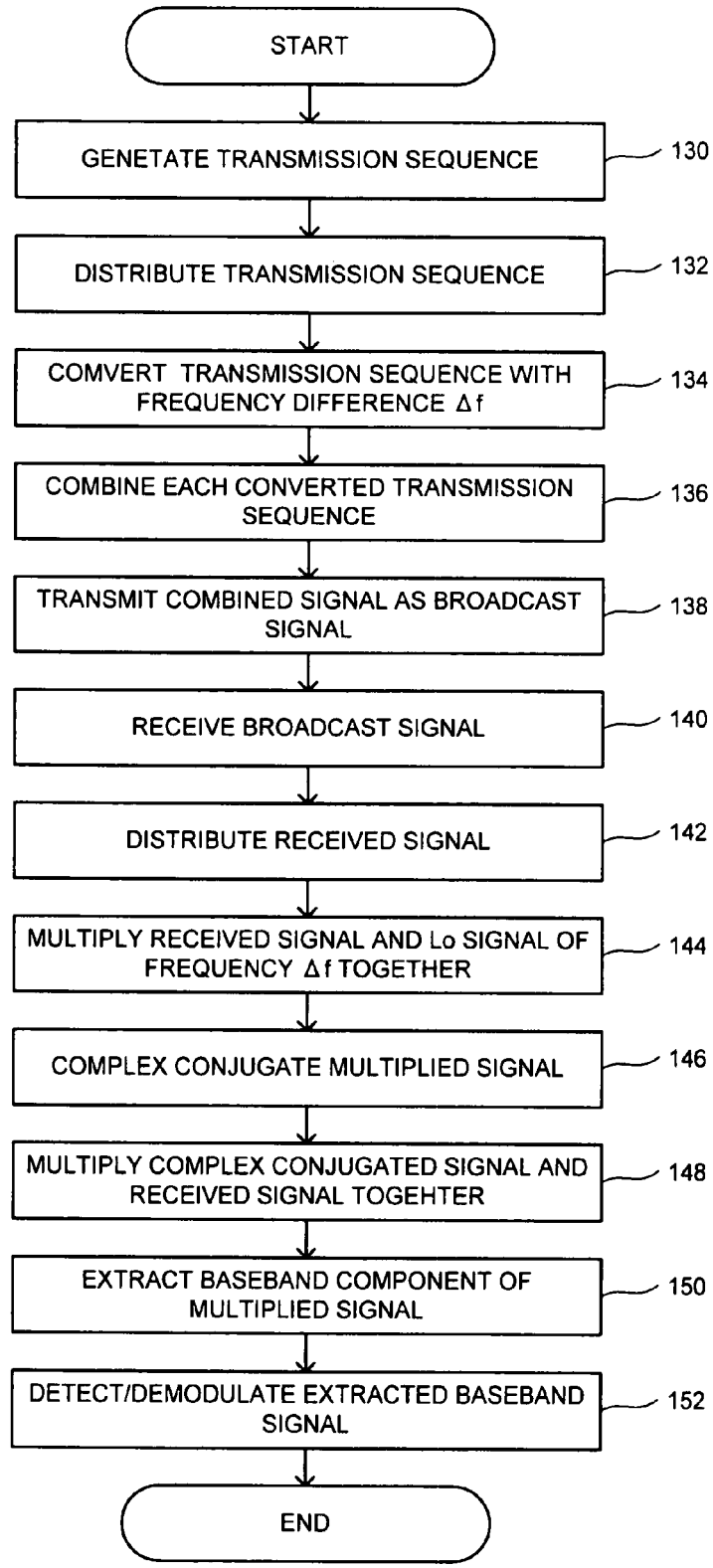
FIG. 6 is a flowchart explaining the operation of the communication system according to the first embodiment.

Here, when attention is paid to the interference wave in FIG. 5, an interference wave a and an interference wave d in FIG. 5 are located at different frequencies f0 and f0+Δf, respectively. In a case that signal of the spectrum of the interference wave a and signal of the spectrum of the interference wave d are multiplied together, since there is no other signal corresponding to the frequency f0 or f0+Δf by which the interference waves are to be multiplied, as a result of the multiplication, the interference wave signal of the frequency f0 disappears. Similarly, in a noise circumstance, if an interference wave and a noise are multiplied together, only a signal much smaller than a multiplication result of desired waves (c and e) is outputted. Therefore, the signal detector 122 is able to detect only a desired broadcast signal (in this example, the component of the frequency f2) carried by signals having the frequency difference Δf (S152).

As stated above, according to the communication system of this embodiment, the desired wave is converted to the baseband signal and the interference wave is converted to the very small signal. In other words, even under existence of the interference wave, it is possible to detect existence of the broadcast signal being the desired wave and of the transmitter. Further, according to the communication system of this embodiment, the receiver is not required to know the frequencies f1 or f2. If the receiver knows only the difference of the f1 and f2, that is, Δf, it is possible to detect the transmission sequence transmitted by a transmitter side.

Figure 7:
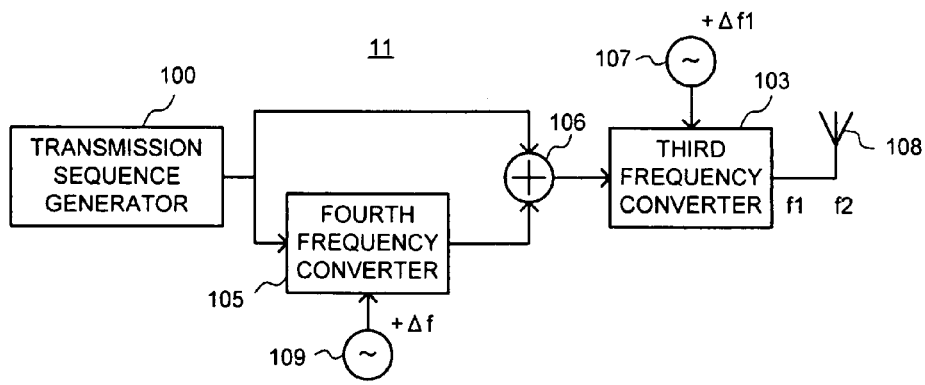
FIG. 7 is a block diagram showing a modification example of the transmitter of the communication system according to the first embodiment.

Here, a modification example of the transmitter 10 will be described with reference to FIG. 7. In the transmitter 10 shown in FIG. 1, the output of the transmission sequence generator 100 is distributed into two and inputted to the two frequency converters. A transmitter 11 shown in FIG. 7 is different in that an output of a transmission sequence generator 100 is distributed into two, and a frequency of one of the outputs is Δf converted. In description below, components common to FIG. 1 are denoted with common symbols and numerals and redundant description will be omitted.

As shown in FIG. 7, the transmitter 11 includes the transmission sequence generator 100, a third frequency converter 103, a fourth frequency converter 105, a combiner 106, a first local oscillator 107, a second local oscillator 109, and a transmitting antenna 108. The third frequency converter 103 corresponds to the first frequency converter 102 shown in FIG. 1, and converts an inputted signal to a signal of a frequency f1. The first local oscillator 107 corresponds to the local oscillator 101 shown in FIG. 1, and generates a local signal necessary for a frequency conversion processing of the third frequency converter 103. The fourth frequency converter 105 converts an inputted baseband signal to a signal of a frequency Δf. The second local oscillator 109 generates a local signal necessary for a frequency conversion processing of the fourth frequency converter 105.

A transmission sequence outputted by the transmission sequence generator 100 is distributed into two, one being inputted to the fourth frequency converter 105 and the other being inputted to the combiner 106. The fourth frequency converter 105 converts the inputted transmission sequence of the baseband to the signal of the frequency Δf. The combiner 106 combines the transmission sequence of the baseband and the transmission sequence of the frequency Δf and inputs the combined transmission sequence to the third frequency converter 103. The third frequency converter 103 converts the inputted transmission sequence of the baseband and the transmission sequence of the frequency Δf to a transmission sequence of a frequency f1 and a transmission sequence of a frequency f2 (=f2−f1+f1). The converted high frequency signal is radiated as a radio wave from the transmitting antenna 108.

The transmitter shown in FIG. 7 can transmit a similar broadcast signal to that of the transmitter shown in FIG. 1.

Figure 8:
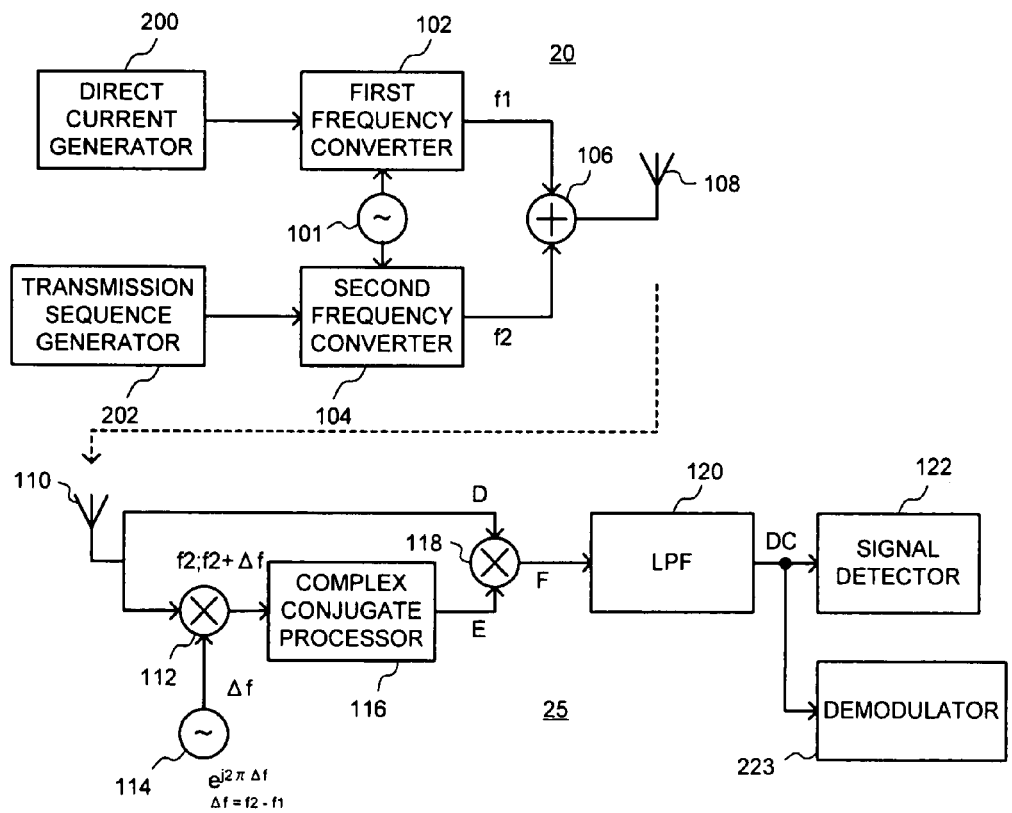
FIG. 8 is a block diagram showing a configuration of a communication system according to a second embodiment.
Figure 9:
FIG. 9 is a diagram showing a structure example of a transmission sequence included in a broadcast signal in the communication system according to the second embodiment.
Figure 10:
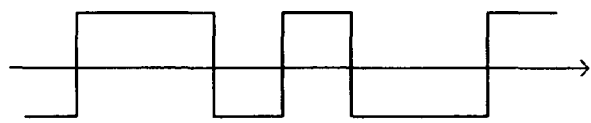
FIG. 10 is a chart showing a waveform example of the transmission sequence of the communication system according to the second embodiment.
Figure 11:
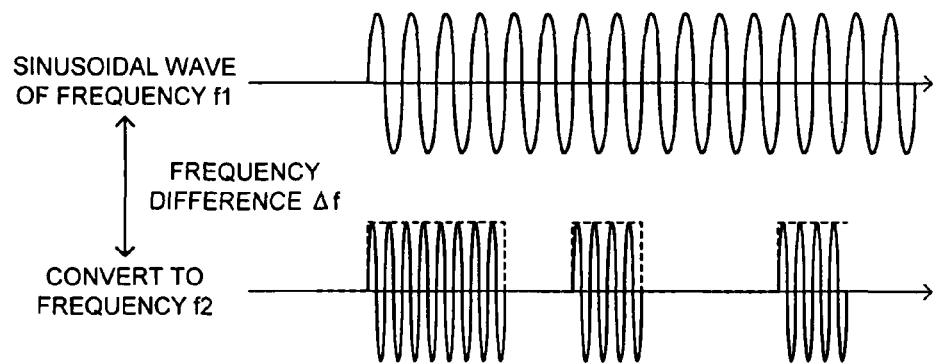
FIG. 11 is a chart showing output examples of a first frequency converter and a second frequency converter of the communication system according to the second embodiment.
Figure 12:
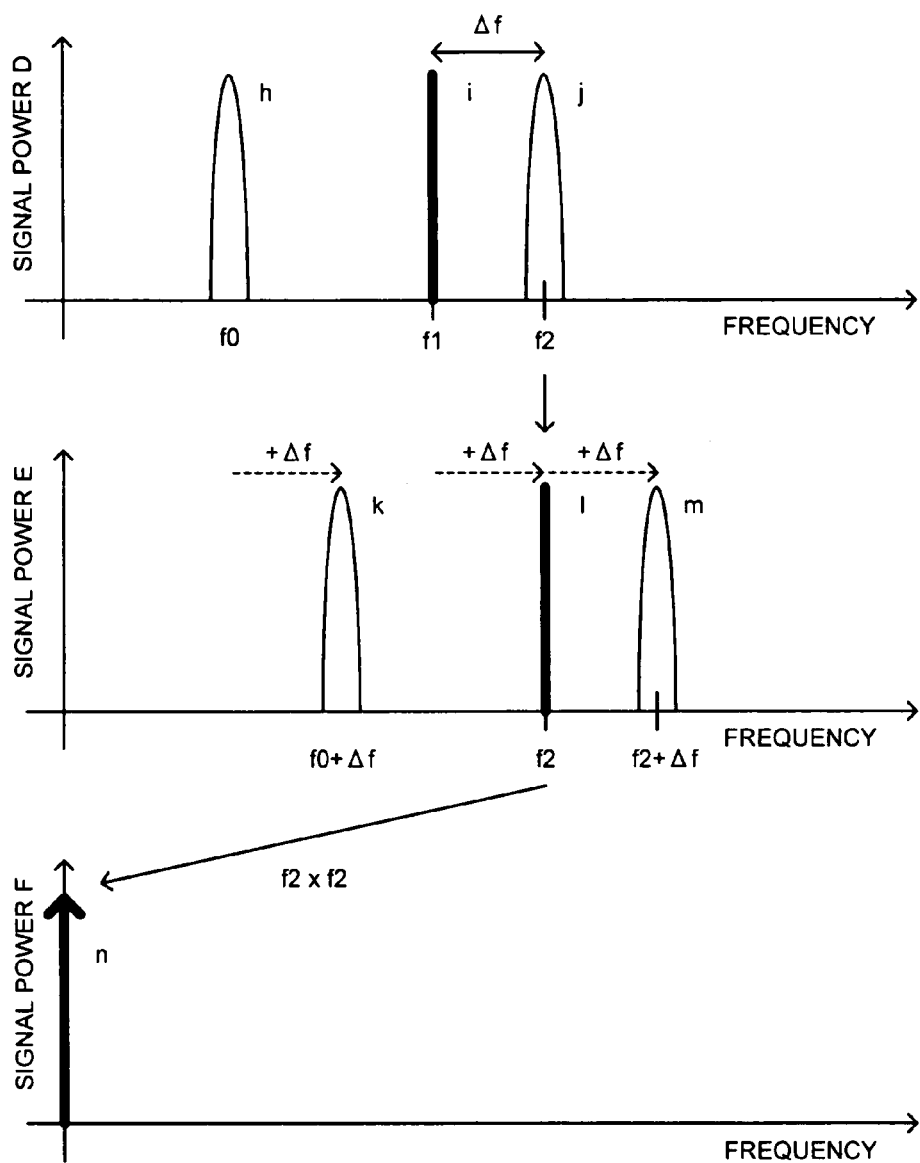
FIG. 12 is a chart explaining an operation of the communication system according to the second embodiment.

Next, a communication system according to a second embodiment will be described in detail with reference to FIG. 8 to FIG. 12. FIG. 8 shows a configuration of the communication system according to the second embodiment, FIG. 9 shows a structure of a transmission sequence included in a broadcast signal, FIG. 10 shows a waveform example of the transmission sequence, FIG. 11 shows output waveform examples of the first frequency converter and the second frequency converter, and FIG. 12 explains an operation of the communication system according to the second embodiment. In description below, the configuration common to the communication system according to the first embodiment are denoted with common symbols and numerals and redundant description will be omitted.

As shown in FIG. 8, the communication system of this embodiment includes a transmitter 20 and a receiver 25. Compared with the transmitter 10 of the first embodiment, the transmitter 20 is different in that the transmitter 20 includes a direct-current signal generator 200 and a transmission sequence generator 202 instead of the transmission sequence generator 100. Also, compared with the receiver 15 of the first embodiment, the receiver 25 is different in that the receiver 25 further includes a demodulator 223.

The direct-current signal generator 200 generates a direct-current signal of a given level. The transmission sequence generator 202 corresponds to the transmission sequence generator 100 of the first embodiment and generates a transmission sequence. However, the transmission sequence generator 202 of the second embodiment generates a BPSK-modulated transmission sequence.

In the transmitter 10 of the first embodiment, the transmission sequence generated by the transmission sequence generator 100 is distributed into two and each is inputted to the first frequency converter 102 and the second frequency converter 104, while in the transmitter 20 of the second embodiment, an output signal of the direct-current signal generator 200 is inputted to the first frequency converter 102 and an output signal of the transmission sequence generator 202 is inputted to the second frequency converter 104. The demodulator 223 in the receiver 25 demodulates a transmission sequence of a baseband to regenerate the concrete information.

Here, an operation of the communication system according to the second embodiment will be described with reference to FIG. 9 to FIG. 12. The transmission sequence generator 202 generates the BPSK-modulated transmission sequence of the baseband. The transmission sequence generated by the transmission sequence generator 202 has two main blocks as shown in FIG. 9, containing in a first block a known sequence decided in advance between the transmitter 20 and the receiver 25, and containing in a second block a broadcast information sequence in which the concrete information such as a modulation method, an error correction encoding method, an encode rate, a frame configuration and the like are written. As a result of the BPSK-modulation, the transmission sequence has a waveform shown in FIG. 10.

The first frequency converter 102 converts the direct-current signal outputted from the direct-current signal generator 200 to a sinusoidal wave signal of a frequency f1 (i in FIG. 12) and inputs the signal to the combiner 106. On the other hand, the second frequency converter 104 converts the transmission sequence generated by the transmission sequence generator 202 to a frequency f2 (j in FIG. 12) and inputs it to the combiner 16. In other words, the combiner 106 combines the sinusoidal wave signal of the frequency f1 and a high frequency signal of the frequency f2 modulated by the transmission sequence, shown in FIG. 11, and outputs a high frequency signal having spectra of frequencies f1 and f2. The combined high frequency signal is radiated to a space from the transmitting antenna 108 as a radio wave. Incidentally, h in FIG. 12 indicates an interference wave radiated from other than the transmitter 20.

When the receiving antenna 110 receives the high frequency signal from the transmitter 20, the high frequency signal is distributed into two, one being inputted to a first mixer 112 and the other being inputted to a second mixer 118, respectively. The first mixer 112 multiplies the high frequency signal from the receiving antenna 110 and an oscillation signal of a local oscillator 114 together. Here, if a frequency of the interference wave is f0 and frequencies of the broadcast signal are f1 and f2, a spectrum indicated by k in FIG. 12, a spectrum indicated by l as well, and a spectrum indicated by m as well are outputted from the first mixer 112, similarly to in the first embodiment.

A complex conjugate processor 116 outputs a complex conjugate signal of an output signal from the first mixer 112. On the other hand, the signal received by the receiving antenna 110 is distributed and inputted also to the second mixer 118. The second mixer 118 multiplies the signal received by the receiving antenna 110 and an output signal of the complex conjugate processor 116 together. The high frequency signal received by the receiving antenna 110, that is, the high frequency signal at a point D in FIG. 8, has a spectrum indicated by h in FIG. 12, a spectrum indicated by i in FIG. 12, and a spectrum indicated by j in FIG. 12. When the signal at the point D and a signal at a point E in FIG. 8 are multiplied together, a broadcast signal component of the frequency f2 is converted to a baseband signal, while an interference wave of a frequency f0 and a broadcast signal component of the frequency f1 are converted to high frequency signals with frequencies other than the frequencies f0, f1, f2.

The second embodiment is different from the first embodiment in that the baseband signal is obtained in the second embodiment by multiplying the transmission sequence modulation signal of the frequency f2 and the sinusoidal wave signal of the frequency f2 together, while the baseband signal in the first embodiment is obtained by multiplying the transmission sequence modulation signals of frequency f2 each other. In other words, in the second embodiment, the transmission sequence generated by the transmission sequence generator 202 of the transmitter 20 is precisely reproduced in the end. This means that the original transmission sequence can be reproduced even if a modulation method of the transmission sequence generated by the transmission sequence generator 202 is a phase modulation method such as a BPSK method.

An LPF 120 is set in a manner to pass mainly the baseband signal among the signals obtained in the multiplication. The signal filtered by the LPF 120 is transmitted to a signal detector 122 and the demodulator 223. The demodulator 223 demodulates the baseband signal from the LPF 120 to reproduce the broadcast signal sequence.

The signal detector 122 detects the known sequence included in the transmission sequence, and the demodulator 223 reproduces the broadcast signal sequence included in the transmission sequence. Since the known sequence is already known between the transmitter and the receiver, it is possible to judge reception of a known signal by providing the signal detector 122 with a matched filter, for example. In other words, even a signal whose frequency is modulated to an unknown frequency at a transmitter side can be converted to a baseband signal as long as a receiver side knows a frequency difference $\Delta f$. Further, timing when the broadcast signal is transmitted can be obtained by referring to an output of this matched filter. Therefore, it is possible to establish time synchronization between the transmitter and the receiver.

As stated above, according to the communication system of this embodiment, the desired wave is converted to the baseband signal, while the interference wave is converted to a very small signal. In other words, even under existence of the interference wave, it is possible to detect existence of the broadcast signal being the desired wave and a transmitter. Further, according to the communication system of this embodiment, the receiver is not required to know the frequency f1 or f2 of the broadcast signal, and the transmission sequence transmitted by the transmission side can be detected as long as the difference between the frequencies f1 and f2, that is, $\Delta f$, is known. Additionally, in the communication system of this embodiment, since the transmission sequence transmitted by the transmitter can be precisely reproduced at the receiver side, the concrete information included in the transmission sequence can be effectively utilized at the receiver side.

Figure 13:
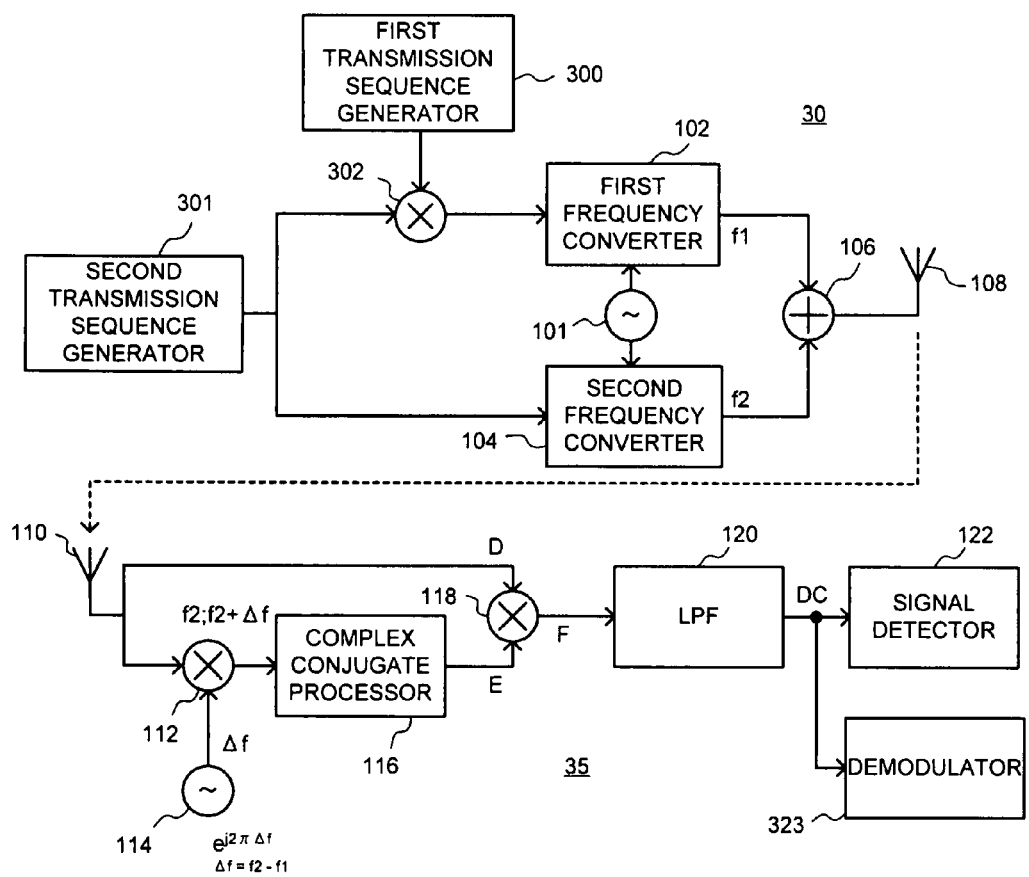
FIG. 13 is a block diagram showing a configuration of a communication system according to a third embodiment.
Figure 14:
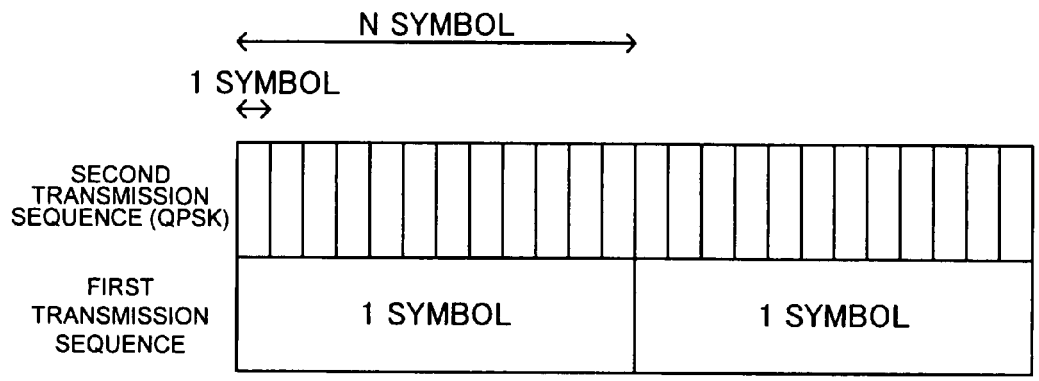
FIG. 14 is a diagram showing an example of a transmission sequence generated by a transmitter of the communication system according to the third embodiment.

Next, a third embodiment will be described in detail with reference to FIG. 13 and FIG. 14. FIG. 13 shows a configuration of a communication system according to the third embodiment and FIG. 14 shows an example of a transmission sequence generated by a transmitter of the communication system according to the third embodiment as well. The communication system according to the third embodiment is altered in the configuration of the transmitter 10 of the communication system according to the first embodiment described before. In the following description, components common to FIG. 1 are denoted with common symbols and numerals and redundant description will be omitted.

As shown in FIG. 13, a transmitter 30 of this embodiment includes a first transmission sequence generator 300, a second transmission sequence generator 301, a mixer 302, a local oscillator 101, a first frequency converter 102, a second frequency converter 104, a combiner 106, and a transmitting antenna 108. The local oscillator 101, the first frequency converter 102, the second frequency converter 104, the combiner 106, and the transmitting antenna 108 respectively are components common to the first embodiment. Further, a receiver 35 of this embodiment further includes a demodulator 323 in addition to the configuration of the receiver 15 according to the first embodiment.

The first transmission sequence generator 300 corresponds to the transmission sequence generator 100 according to the first embodiment, and generates as a first transmission sequence a transmission sequence to be transmitted as a broadcast signal including the concrete information. The second transmission sequence generator 301 generates a second transmission sequence having a symbol rate faster than that of the first transmission sequence. Since the second transmission sequence is used to segment and randomize the first transmission sequence, the second transmission sequence is not required to have a particular meaning as a data sequence, and a signal made by QPSK-modulating a random sequence can be used, for example. Correlation between the first transmission sequence and another interference wave can be made low by randomizing the first transmission sequence by the second transmission sequence. Here, the symbol rate of the second transmission sequence is larger in a value than the symbol rate of the first transmission sequence, and it is desirable that the symbol rate of the second transmission sequence is a faster rate than a bandwidth of an assumable interference wave, for example. However, even if this rate cannot be realized, by making the rate be about fourfold, better signal detection is possible than in a case without randomizing. In the following description, the second transmission sequence generator 301 generates a QPSK signal having a symbol rate N-fold higher than the first transmission sequence generated by the first transmission sequence generator 300.

FIG. 14 is a diagram showing relationship between the first transmission sequence and the second transmission sequence. The second transmission sequence has an N-fold symbol rate compared with the first transmission sequence. The first transmission sequence is a signal (for example, an OOK-modulated signal) to be sent as a broadcast signal, concrete information of the signal, such as a modulation method, an error correction encoding method, an encode rate, or a frame format being modulated, while the second transmission sequence is a signal made by QPSK-modulating a random sequence.

The mixer 302 multiplies the first transmission sequence generated by the first transmission sequence generator 300 and the second transmission sequence generated by the second transmission sequence generator 301 together. Here, since a bit rate of the first transmission sequence is set to be lower than a bit rate of the second transmission sequence, the mixer 302 outputs a signal made by subjecting the second transmission sequence to modulation of the first transmission sequence.

Based on a local signal of the local oscillator 101, the first frequency converter 102 converts an output signal of the mixer 302 to a high frequency signal of a frequency f1, and similarly, the second frequency converter 104 converts the second transmission sequence generated by the second transmission sequence generator 301 to a high frequency signal of a frequency f2. The combiner 106 combines an output signal of the first frequency converter 102 and an output signal of the second frequency converter 104, and the transmitting antenna 108 radiates the combined high frequency signal to a space as a radio wave.

The receiver 35 has a commonality with the receiver 25 in the second embodiment shown in FIG. 8 in terms of the configuration, only a function of the demodulator 323 being different. A received signal is distributed and inputted to a first mixer 112 and a second mixer 118. The first mixer 112 multiplies the received signal by a local signal of a frequency $\Delta f$ generated by a local oscillator 114, and a complex conjugate processor 116 outputs a complex conjugate signal of an output signal of the first mixer 112. The second mixer 118 multiplies the received signal and an output signal of the complex conjugate processor 116 together, and supplies obtained signals to an LPF 120. The LPF 120 passes a baseband signal among the signals obtained in the second mixer 118. As a result, the baseband signal whose center frequency is DC is inputted to a signal detector 122 and the demodulator 323.

The signal detector 122 judges existence of the transmitter 30 and presence/absence of a broadcast signal, based on presence/absence of the baseband signal. The demodulator 323 reproduces the first transmission sequence based on a DC component of the baseband signal.

Subsequently, an operation of the communication system according to the third embodiment will be described. The first transmission sequence generator 300 generates the first transmission sequence including the concrete information, while the second transmission sequence generator 301 generates the second transmission sequence of the symbol rate N-fold of the first transmission sequence. The second transmission sequence is distributed into two and inputted to the mixer 302 and the second frequency converter 104.

The mixer 302 multiplies the first transmission sequence and the second transmission sequence together and inputs an obtained transmission sequence to the first frequency converter 102. Here, the local oscillator 101 supplies local signals to the first frequency converter 102 and the second frequency converter 104, and the first frequency converter 102 converts the second transmission sequence modulated by the first transmission sequence to a high frequency signal of a frequency f1 and inputs an obtained signal to the combiner 106. Similarly, the second transmission converter 104 converts the second transmission sequence to a high frequency signal of a frequency f2 and inputs an obtained signal to the combiner 106. At this time, a frequency difference between each is given $\Delta f$. The combiner 106 combines the inputted high frequency signals and inputs the combined signal to the transmitting antenna 108, and the transmitting antenna 108 radiates an electric wave to a space. As a result, a radio wave having spectra of the frequencies f1 and f2 as a broadcast signal is transmitted as the broadcast signal.

When the receiving antenna 110 receives the high frequency signal from the transmitter 30, the high frequency signal is distributed into two, one being inputted to the first mixer 112, the other being inputted to the second mixer 118, respectively. The first mixer 112 multiplies the high frequency signal from the receiving antenna 110 and the local signal of the frequency Δf of the local oscillator 114 together. The complex conjugate processor 116 outputs the complex conjugate signal of the signal from the first mixer 112.

On the other hand, the signal received by the receiving antenna 110 is distributed and inputted also to the second mixer 118. The second mixer 118 multiplies the signal received by the receiving antenna 110 and the output signal of the complex conjugate processor 116 together. As a result of the multiplication, the component of the broadcast signal of the frequency f2 is converted to the baseband signal.

The LPF 120 passes mainly the baseband signal among the signals obtained in the multiplication in the second mixer 118. The signal filtered by the LPF 120 is sent to the signal detector 122 and the demodulator 323. The signal detector 122 judges existence of the transmitter 30 and presence/absence of the broadcast signal based on presence/absence of the baseband signal.

The demodulator 323 demodulates the baseband signal sent from the LPF 120 and reproduces the broadcast signal sequence. The output of the LPF 120 is the baseband signal, whose amplitude is subject to modulation of the first transmission sequence. Thus, the demodulator 323 reproduces an original first transmission sequence based on a polarity and the like of the direct current component of the output of the LPF 120.

As stated above, also in the communication system of this embodiment, it is possible to precisely reproduce the first transmission sequence including the concrete information and the like at a receiver side. It should be noted that any sequence can be used for the second transmission sequence as long as phase modulation is applied thereon. In the example described above, it is described as a random sequence is used as the second transmission sequence, but a modulation signal or transmission bit other than the above random sequence can bring a similar effect.

Figure 15:
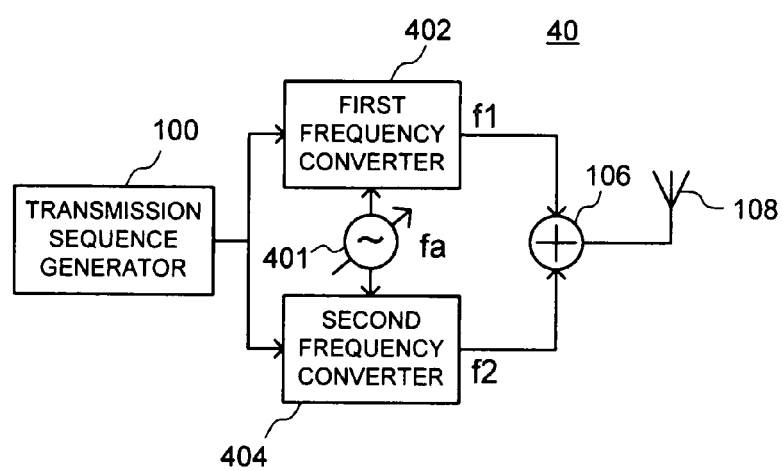
FIG. 15 is a block diagram showing a configuration of a transmitter of a communication system according to a fourth embodiment.

Next, a fourth embodiment will be described in detail with reference to FIG. 15 and FIG. 16. FIG. 15 shows a configuration of a transmitter of a communication system according to the fourth embodiment, while FIG. 16 explains an operation of the communication system according to the fourth embodiment. The communication system of this embodiment is altered from the communication systems according to the first to third embodiments in terms of a configuration of a transmitter. Thus, components common to the transmitter according to the first to third embodiments are denoted with the same symbols and numerals and redundant description will be omitted.

As shown in FIG. 15, a transmitter 40 in the communication system of this embodiment is made by replacing the local oscillator 101 in the configuration of the transmitter 10 according to the first embodiment shown in FIG. 1 with a frequency controllable local oscillator (VFO) 401. The VFO 401 supplies local signals for frequency conversion to a first frequency converter 402 and a second frequency converter 404. The VFO 401 can change its oscillation frequency fa based on an instruction from an unshown controller.

The first frequency converter 402 and the second frequency converter 404 correspond to the first frequency converter 102 and the second frequency converter 104 in the first embodiment respectively, and are set to be able to control a conversion frequency based on the local signal sent from the VFO 401. For example, when the local signal of the frequency fa is received from the VFO 401, the first frequency converter 402 converts a baseband signal to a high frequency signal of a frequency f1 and the second frequency converter 404 converts the baseband signal to a high frequency signal of a frequency f2 as well. Here, as stated before, a frequency difference Δf (=f2−f1) is known in a receiver side.

Figure 16:
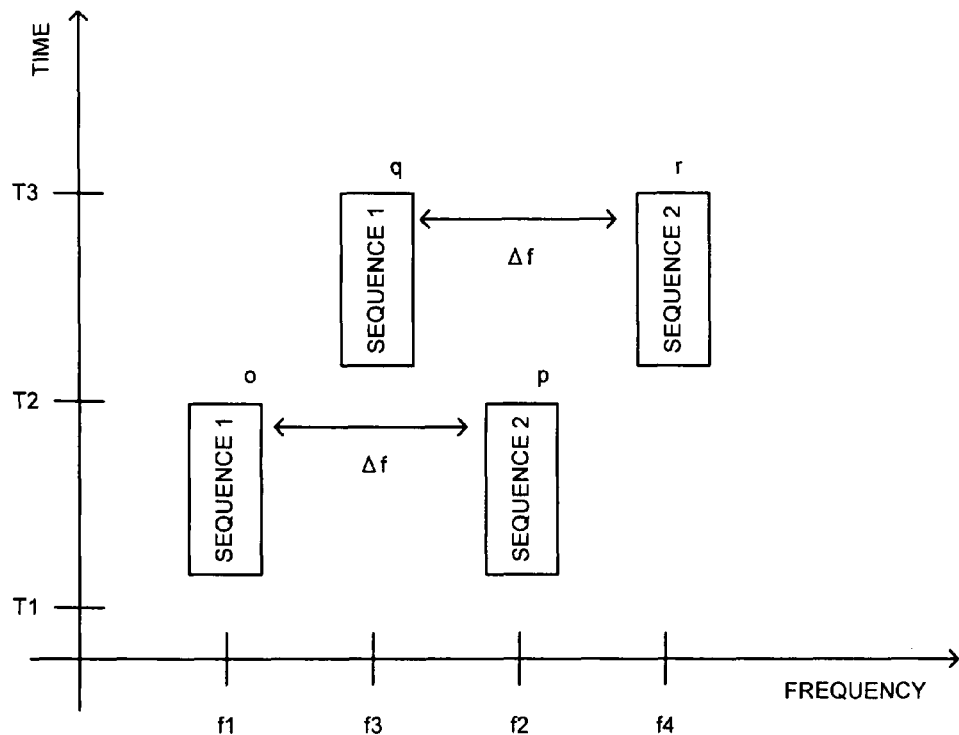
FIG. 16 is a chart explaining an operation of the communication system according to the fourth embodiment.

It is configured that, if the frequency of the local signal from the VFO 401 is changed to fb from fa, the conversion frequency of the first frequency converter 402 is controlled to become f3 from f1 and the conversion frequency of the second frequency converter 404 is controlled to become f4 from f2 but the frequency difference between the frequencies f3 and f4 is always Δf (FIG. 16). In other words, the first frequency converter 402 and the second frequency converter 404 in this embodiment are common to the first to the third embodiments in that frequency conversion is performed in a manner that the frequency difference becomes Δf, and are different in that the conversion frequency is controllable.

An operation of the communication system of this embodiment will be described. In an example shown in FIG. 15, the VFO 401 supplies the local signals of the frequency fa to the first frequency converter 402 and the second frequency converter 404. A transmission sequence generated by a transmission sequence generator 100 is converted to a high frequency signal of the frequency f1 by the first frequency converter 402 and converted to a high frequency signal of the frequency f2 by the second frequency converter 404. When an oscillation frequency of the VFO 401 is controlled to become fb from fa by the instruction from the unshown controller, the first frequency converter 402 and the second frequency converter 404 convert the transmission sequence to high frequency signals of frequencies f3 and f4 respectively, with the frequency difference Δf being fixed. The high frequency signals of the frequencies f3 and f4 are combined by a combiner 106 to be radiated from an antenna 108 as a radio wave.

Here, there is considered a case that a receiver having a configuration common to the first to third embodiments receives the radio wave radiated from the transmitter 40. As described hereinabove, since the broadcast signal is detected using only the frequency difference Δf in the receivers according to the first to third embodiments, even when the frequencies of the broadcast signal transmitted by the transmitter 40 are changed to become f3 and f4 from f1 and f2, as long as the frequency different Δf thereof is fixed, existence of the transmitter 40 and the broadcast signal can be detected.

In other words, as shown in FIG. 16, assume that during times T1 to T2, the VFO 401 oscillates the local signal of the frequency fa and the transmitter transmits the broadcast signal of the frequencies f1 and f2 (f2−f1=Δf). When the VFO 401 controls the frequency of the local signal to become fb from fa at the time T2, the broadcast signal transmitted by the transmitter is the frequencies f3 and f4 respectively, with the frequency difference Δf being maintained. Even if the transmitter side operates as above, the receiver can detect existence of the transmitter and the broadcast signal, and demodulate the broadcast signal, as long as the receiver knows the frequency difference Δf of the broadcast signal paired.

The communication system of this embodiment is effective in a circumstance in which an interference source exist in particular. For example, if the interference source exists in the frequency f1, it is not desirable to transmit the broadcast signal at the same frequency f1. On the other hand, if the transmitter side does not know the frequency transmitted by the interference source, it is difficult to evade interference. Then, by the transmitter changing the transmitting frequency (from f1 to f3 in FIG. 16) with time, the interference can be evaded after a given time passes, even if part of the signal overlaps an interference signal transmitted by the interference source.

As stated above, according to a communication system of this embodiment, since a transmitter can control a transmission frequency, communication which is resistant to interference is possible. It should be noted that though it is described as the transmitter 40 is provided with the VFO 401 instead of the reference oscillator 400 in the first embodiment in the above description, the transmitters according to the modification example (FIG. 7) of the first embodiment, the second embodiment (FIG. 8) and the third embodiment (FIG. 13) can be provided with similar VFOs to be able to control transmission frequencies.

Figure 17:
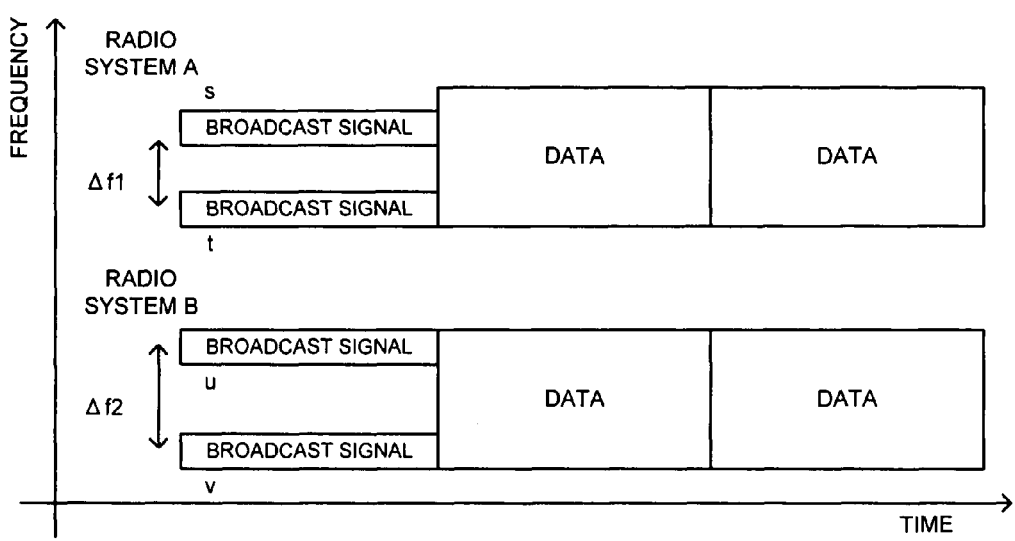
FIG. 17 is a chart showing an application example of each embodiment.

Next, an application example of the communication systems according to the first to fourth embodiments will be described. FIG. 17 is a schematic diagram showing an example in which a plurality of radio systems coexist in the same communication range.

If the plurality of radio systems coexist in the same frequency band, it is necessary for each child station to identify a parent station of the radio system to which the child station belongs. For example, a cellular terminal identifies a corresponding base station, or a wireless LAN terminal identifies a corresponding AP (Access Point).

Here, there is considered a case that radio systems A and B are the communication systems according to the first to fourth embodiments described hereinabove. A frequency difference $\Delta f1$ for the radio system A and a frequency difference $\Delta f2$ for the radio system B are prescribed, and respective parent stations transmit broadcast signals s and t, and broadcast signals u and v at different frequencies from each other.

The child station belonging to the radio system A starts a receiving operation with the frequency difference being $\Delta f1$. In this case, since the child station of the radio system A can detect and demodulate the broadcast signals s and t, subsequent data communication can be realized based on reproduced concrete information. Similarly, the child station belonging to the radio system B starts a receiving operation with the frequency difference being $\Delta f2$, whereby broadcast signals u and v can be detected and demodulated, so that subsequent data communication can be realized.

As stated above, in the communication systems according to the first to fourth embodiments, making a frequency difference $\Delta f$ being different value per a communication system enables a receiver side to identify the system to which the receiver belongs.

Figure 18:
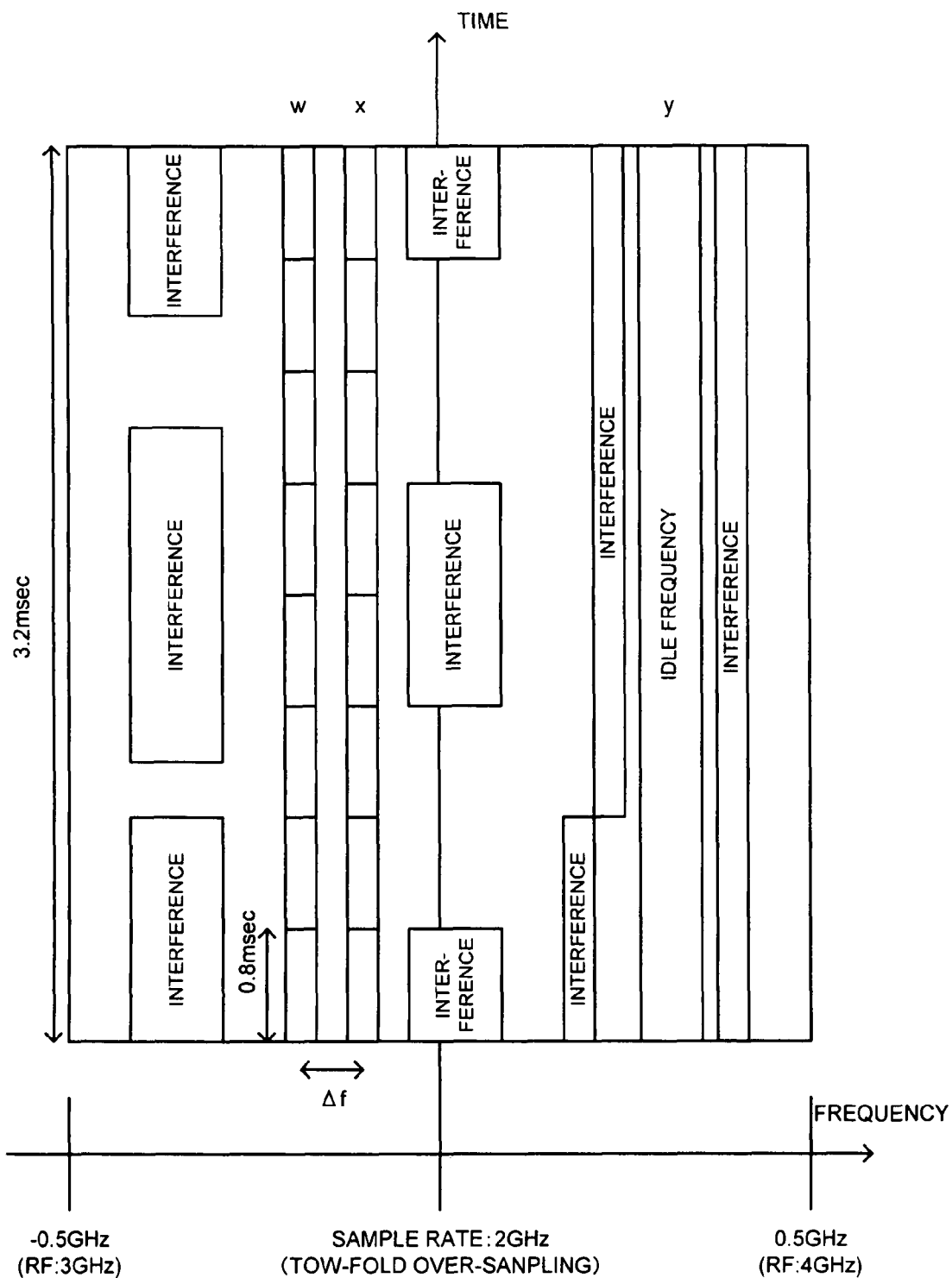
FIG. 18 is a chart showing another application example of each embodiment.

Subsequently, another application example will be described. FIG. 18 is a frequency spectrum atlas showing an example of a case that the communication systems according to the first to fourth embodiments are applied to a concrete system.

A receiver converts a frequency of a band of 3 to 4 GHz to a baseband signal, samples the signal at a sampling rate of 2 GHz, and takes in the signal as a digital signal. Also, a transmitter transmits OOK-modulated broadcast signals (w, x in FIG. 18) at any frequency among the band of 3 to 4 GHz with the broadcast signals being apart from each other by a frequency $\Delta f$. The OOK-modulated broadcast signals each has a bandwidth of 2 MHz, that is, a symbol length of 0.5 µsec, has a burst of 0.8 msec, and is transmitted repeatedly per 0.8 msec. Then, a number of symbols included in one burst is 1600. Further, one symbol becomes 1000 samples by sampling in the receiver. The broadcast signals w and x include idle frequency information (y in FIG. 18) in which communication is performed after synchronization is established, a communication method and the like.

Under these circumstances, the receiver first starts reception of the frequency band of 3 to 4 GHz. For example, if the receiver is the receiver 15 according to the first embodiment, the receiver 15 converts a frequency of a received signal with a bandwidth of 1 GHz by $\Delta f$, and after applying a complex conjugate processing, multiplies the obtained signal and the received signal itself together. Then, the broadcast signals apart by $\Delta f1$ are multiplied by each other so that a baseband signal whose center frequency is a direct current can be obtained.

If a pass bandwidth of the LPF 120 of the receiver 15 is 2 MHz being a symbol speed, a sample sequence of 1000 samples constituting each symbol of an OOK signal being the baseband signal is in-phase added and outputted from the LPF 120. As a result, it becomes possible to obtain a gain of 30 dB against a noise. This gain is effective also to an interference wave, if the interference wave can be regarded as a white noise, as a result of multiplication. Since the signal outputted from the LPF 120 is an OOK-modulated signal, the signal detector 122 can reproduce a bit sequence of the broadcast signal by an OOK-demodulation processing. In this case, the idle frequency information included in the broadcast signal is reproduced, and subsequent communication is performed at a frequency indicated by y in FIG. 18.

If the pass bandwidth of the LPF 120 of the receiver 15 is 1.25 kHz being an inverse number of the burst length, all of the OOK signals of 1600 symbols forming the burst and further 1000 samples forming the symbols of the OOK signals are in-phase added. As a result, a gain of about 62 dB against the noise or white interference can be obtained. In this case, since the pass bandwidth of the LPF 120 is narrow, demodulation of the OOK signal is difficult, but detection of the broadcast signal itself is possible.

As described above, according to each of above embodiments, a broadcast signal can be detected and demodulated even if a transmission frequency of the broadcast signal is unknown. This is effective in a cognitive radio communication system and the like in which a communication frequency is dynamically changed to perform communication. In other words, in the cognitive radio communication system, since a transmitter must use a frequency which is not used by another communication system, a frequency at which a broadcast signal is transmitted can always change. In each embodiment, since the transmitter is detected based on a frequency difference between the broadcast signals transmitted simultaneously, instead of the frequency itself of the broadcast signal, the receiver is able to detect the broadcast signal even if the transmission frequency is arbitrary.

It should be noted that though in the above embodiments, it is described as the broadcast signal includes the concrete information, but this is not indispensable. In other words, after synchronization is established between the transmitter and the receiver by the broadcast signal, subsequent communication may be continued at the frequency of the broadcast signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A communication system, comprising:
a transmitter including:
a first frequency converter converting a frequency of a provided signal to a first frequency band to generate a first signal and converting the frequency of the provided signal to a second frequency band to generate a second signal, the second frequency band having a given frequency difference against the first frequency band; and a combiner combining the first signal and the second signal to output a transmission signal, and a receiver including:

a second frequency converter converting the transmission signal to a frequency-shifting signal shifted by the given frequency difference;

a first multiplier multiplying the transmission signal and the frequency-shifting signal together to output a multiplied signal;

a filter extracting a baseband signal from the multiplied signal; and a detector detecting significant information from the baseband signal.

2. The system according to claim 1, wherein the receiver further includes an oscillator generating a local signal of a frequency equivalent to the given frequency difference, and wherein the second frequency converter multiplies the transmission signal and the local signal together to convert the transmission signal to the frequency-shifting signal.

3. The system according to claim 1, wherein the second frequency converter includes a complex conjugate processor outputting a complex conjugate signal as the frequency-shifting signal, and wherein the first multiplier multiplies the transmission signal and the complex conjugate signal together.

4. The system according to claim 1, wherein the transmitter further includes a first signal generator generating the provided signal for the first frequency converter, the provided signal including a parameter used by the transmitter and the receiver for communication, and wherein, in the receiver, the detector detects the parameter as the significant information.

5. The system according to claim 1, wherein the transmitter further includes a first signal generator generating a transmission sequence as the provided signal for the first frequency converter, and wherein the first frequency converter converts a frequency of the transmission sequence to the first frequency band to generate the first signal, and converts the frequency of the transmission sequence to the second frequency band to generate the second signal.

6. The system according to claim 1, wherein the transmitter further includes: a first signal generator generating a transmission sequence as part of the provided signal for the first frequency converter; and a direct-current signal generator generating a direct-current signal as another part of the provided signal for the first frequency converter, and wherein the first frequency converter converts a frequency of the transmission sequence to the first frequency band to generate the first signal, and converts a frequency of the direct-current signal to the second frequency band to generate the second signal.

7. The system according to claim 1, wherein the transmitter further includes: a first signal generator generating a first transmission sequence; a second signal generator generating a second transmission sequence whose symbol rate is higher than a symbol rate of the first transmission sequence as part of the provided signal for the first frequency converter; and a second multiplier multiplying the first transmission sequence and the second transmission sequence together to generate another multiplied signal as another part of the provided signal for the first frequency converter, and wherein the first frequency converter converts a frequency of the other multiplied signal to the first frequency band to generate the first signal, and converts a frequency of the second transmission sequence to the second frequency band to generate the second signal.

8. The system according to claim 1, wherein, in the transmitter, the first frequency converter s configured to alter the first frequency band and the second frequency band with the given frequency difference being maintained.

9. A communication method comprising:

transmitting, by a transmitter, a. first signal generated by converting a frequency of a provided signal to a first frequency band, and a second signal generated by converting the frequency of the provided signal to a second frequency band having a given frequency difference against the first frequency band collectively as a transmission signal;

converting, by a frequency converter of a receiver, the transmission signal to a frequency-shifting signal shifted by the given frequency difference;

multiplying, by a multiplier of the receiver, the transmission signal and the frequency-shifting signal together to output a multiplied signal;

extracting, by a filter of the receiver, a baseband signal from the multiplied signal; and detecting, by a detector of the receiver, significant information from the baseband signal.

10. A transmitter detecting method, comprising:

converting, by a frequency converter, a transmission signal having a first signal generated by converting a frequency of a provided signal to a first frequency band and a second signal generated by converting the frequency of the provided signal to a second frequency band having a given frequency difference against the first frequency band, to a frequency-shifting signal shifted by the given frequency difference;

multiplying, by a multiplier, the transmission signal and the frequency-shifting signal together to output a multiplied signal;

extracting, by a filter, a baseband signal from the multiplied signal; and detecting, by a detector, significant information from the baseband signal.

* * * * *